Jan. 28, 1969   J. BLAIR   3,424,067
HANDLE FORMING MACHINE
Filed June 10, 1966   Sheet 1 of 2

United States Patent Office 3,424,067
Patented Jan. 28, 1969

3,424,067
HANDLE FORMING MACHINE
John Blair, Higherford, Lancashire, England, assignor to Coloroll Limited, London, England, a British company
Filed June 10, 1966, Ser. No. 556,752
Claims priority, application Great Britain, June 23, 1965, 26,504/65
U.S. Cl. 93—1                                              11 Claims
Int. Cl. B31d 1/06

ABSTRACT OF THE DISCLOSURE

A machine for producing a composite patch and loop-shaped carrying handle for attachment to a bag including means to feed the handle and patch forming material, means to shape the handle material into a sinuous shape, and means to apply the patch material to the sinuous-shaped handle material and secure it thereto. The patch material is applied to at least one side of the handle material and is substantially centrally located with respect to the sinuous shape. Heat and pressure means are applied as necessary and the composite strip is cut both longitudinally and laterally to separate the individual handles.

---

Figure 1:
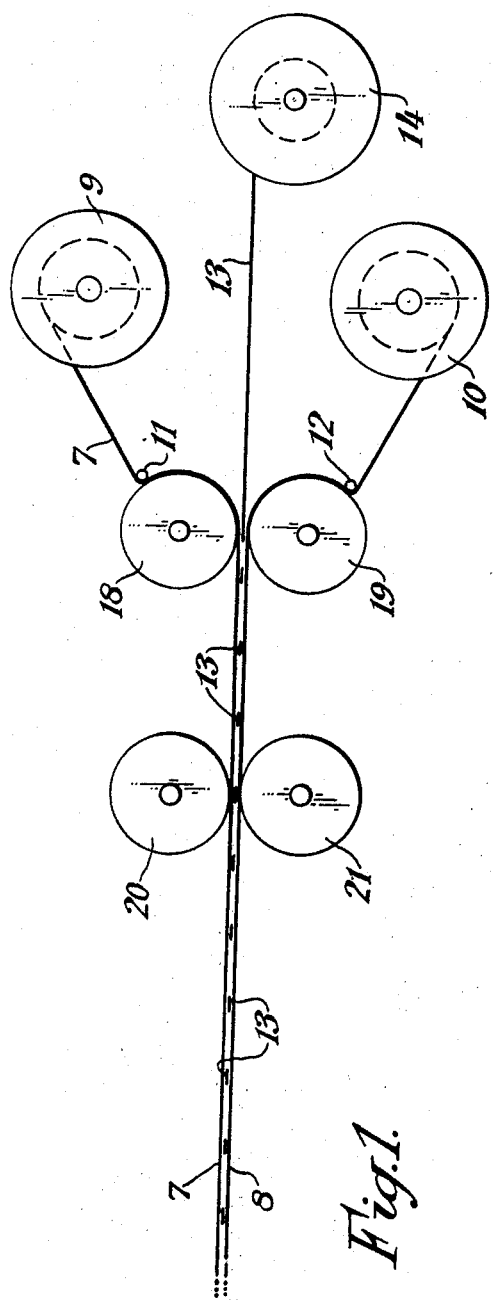

The machine forming the subject of the present invention has been designed for use in the production of paper carrier bag handles constructed from any suitable material, for example a thermo-plastics material such as for example polyvinylchloride or polythene. The present invention is concerned with the formation of a handle and its attachment to a patch which can finally be adhesively secured to the paper carrier bag after or during its formation.

It is preferred to construct the handle carrying patch from paper or like cellulosic material as it can easily be struck to the paper bag by most well known adhesives and the problem with which the present invention is concerned is the formation of the carrying handles in quantities and their attachment to the patch forming material. The handles which are of loop like form may be composed of any suitable material such as string or cord, tape or preferably an extruded thermo-plastics material in the form of strip or tube. Although it is within the scope of the invention to employ a hot or cold setting adhesive for securing the handle to the patch, the adhesive having the property of quick setting, it is preferred in some cases to employ a heat fixing or welding process, the handle forming material being softened during its application so that it becomes tacky. To obtain a better stick the face or faces of the patch may be coated with a thin layer of the plastics material used for the handle and when using a handle composed of string, cord or like material and it is desired to use a heat fixing process, the string or like handle forming material may be impregnated or coated with the plastics material to ensure a good stick when the parts to be joined are heated to the requisite temperature and pressed together. In this way the plastics handles or plastics coated handles and patch will adhere firmly together and without risk of separation when the carrier bag is carried when filled with goods.

Objects of the present invention are to evolve an improved method of forming the handles in quantities, attaching the handles to the patch forming material and if required finally cutting the patch forming material into sections, each carrying a handle and evolving a machine for carrying out the above process.

The carrying handles are constructed from strip or tubular plastics material string, cord, tape or the like and are generally of loop shape and it is proposed therefore that the patches shall be cut from a strip of paper drawn from a roll, the width of the strip being double that required for each patch, the handle forming material being bent into sinuous or zig-zag formation and whilst held in that shape, fixed to the paper strip, the loops projecting beyond the opposite longitudinal edges, the strip being finally slit along its longitudinal centre line and if required cut into lengths providing a number of individual patches each carrying a handle. If the strip is not cut into individual patches it may be nicked at appropriate positions so that the ptches can be easily separated at a later date and the patch forming strip with attached handles fed immediately or later in a bag forming machine where the patches are separated and adhesively secured to the bag. Although a patch of single thickness is suitable it is preferred that each patch shall comprise two paper layers heat fixed or adhesively secured together and consequently it is preferred to feed in two strips of patch forming paper coated on their adjacent faces with a thin layer of the plastics material forming the handles or other suitable plastics compositions if the two paper layers are to be heat fixed together. In this case the plastics material forming the handles will be heat fixed or welded to both paper strips, the handles being sandwiched between the two strips, which are themselves heat fixed or welded together face to face, the duplex strip carrying the handles being again split in two along its longitudinal centre and finally if required cut transversely to form a number of duplex patches, each carrying a loop like handle, the coated faces of the parts of each duplex patch combining together to provide a secure weld.

In a machine for producing a composite paper patch and loop shaped plastics carrying handle for attachment to a carrier bag, the handle and patch forming material being in strip form drawn from supply drums at one end of the machine, the machine including means for bending the handle forming material into sinuous or zig-zag shape and feeding same forwardly through the machine in contact with the patch forming strip, the latter lying centrally of the sinuous length of handle material so that the latter projects from opposite edges of the strip in the form of longitudinally spaced loops, rollers or other means for exerting pressure on and if required applying heat to the handle forming strip material and patch forming material to ensure a good fix between the parts.

The term "strip" used in describing the handle forming material is intended to cover material which is of any suitable cross-sectional shape and of solid or tubular form.

Figure 3:
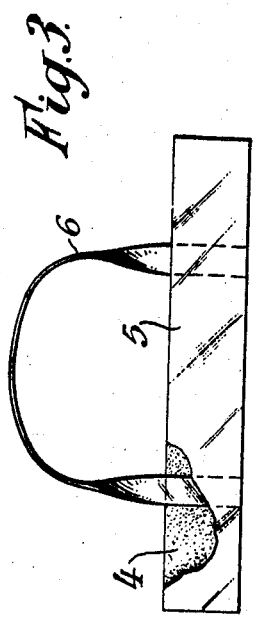
Figure 2:
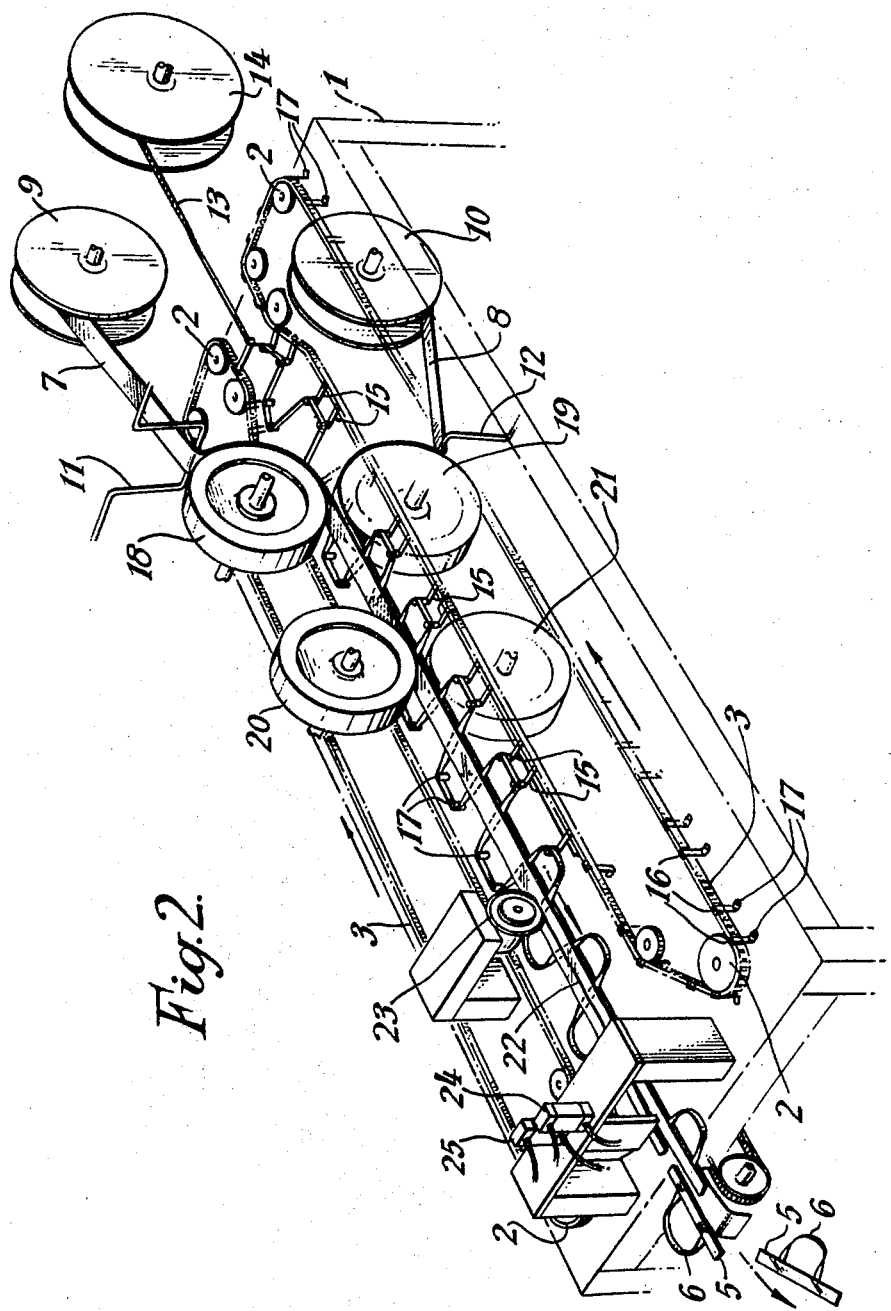

Referring to the accompanying drawings:
FIGURES 1 and 2 diagrammatically illustrate the passage of the patch forming strips and handle forming strip through the machine, FIGURE 2 illustrating the main component parts of the machine, but excluding details of the construction;
FIGURE 3 is a view of the composite patch and handle, the front layer of material forming the patch being broken away at one point to show one extremity of the handle.

The machine hereinafter described is designed for heat fixing the handle forming material to the strips forming the composite patch or securing the parts together with a heat setting adhesive, slitting the patch forming strip and attached handles longitudinally and finally cutting the material transversely to form a series of patches each carrying a loop shaped handle.

The machine bed may be of any suitable construction and is diagrammatically shown in FIGURE 2 and indicated by reference numeral 1. The machine bed is fitted with toothed sprocket wheels 2, two sets of sprocket wheels 2 being arranged on opposite sides of the machine each set of sprocket wheels carrying an endless chain 3 and being continuously driven by means of an electric motor or other prime mover (not shown) through the medium of suitable gearing. The machine illustrated is designed to produce a composite patch and loop shaped handle as shown in FIGURE 3, the patch being of dual construction and comprising two strip like parts 4 and 5 between which the extremities of the loop shaped handle 6 are sandwiched.

The patch is produced from two strips of paper or other suitable material, the two strips being indicated by reference numerals 7 and 8 and being drawn respectively from drums 9 and 10, the strips passing over guide members 11 and 12. The loop like handles are produced from an extruded plastics strip 13 which is drawn from a drum 14 and is picked-up by the two conveyor chains in a manner hereinafter described.

The adjacent faces of the strips 7 and 8 are coated with a solution of a plastics material corresponding to or having an affinity with the plastics material forming the handle.

As shown in FIGURE 2, the two endless conveyor chains are fitted with a series of arms 15 which are hinged to the chains about horizontal axes 16, each arm carrying a cylindrical freely revolvable peg 17. Normally the arms 15 depend downwardly in the position shown on the left-hand side of FIGURE 2, the direction of movement of the two conveyor chains being shown by the arrows, the arms as they approach the point where they are intended to pick-up the handle forming strip 13 being lifted by means of ramps until they occupy a horizontal position, the revolvable pegs 17 being vertical. With the pegs in a vertical position they automatically pick-up the strip 13 so that the latter assumes a sinuous or zig-zag form as shown clearly in FIGURE 2. At the same time, strips 7 and 8 close onto the zig-zag strip 13 so that the latter is sandwiched between the two strips.

The action of sandwiching the strip 13 between strips 7 and 8 has the effect of twisting strip 13 between the pegs associated with opposite conveyors so that the parts of the strip 13 which engage strips 7 and 8 lie parallel therewith.

The parts of the strip 13 which are in contact with strips 7 and 8 are heat fixed to the strips and the strips 7 and 8 heat fixed together in the following manner. Strip 7 is guided by means of guide member 11 into engagement with the periphery of roller 18 and in a similar manner strip 8 is guided into engagement with the periphery of roller 19. Rollers 18 and 19 are driven in opposite directions and consequently feed strips 7 and 8 forwardly towards the output end of the machine. Two additional rollers 20 and 21 are provided which are again driven in opposite directions which also assist in feeding strips 7 and 8 in a forward direction.

Rollers 18, 19, 20 and 21 are heated electrically so that the patch forming strips 7 and 8 and handle forming strip material 13 acquire a sufficiently high temperature to ensure a good heat fix or weld between the parts as they pass from between rollers 20 and 21. Any suitable means may be employed for electrically heating the drums. For example, the rollers may be fitted with internally arranged electric heaters to which current is supplied through brushes engaging side flanges on the rollers. If required the handle forming strip may pass through a hot zone prior to passing between rollers 18 and 19 to pre-heat the strip and soften it before it comes into contact with the patch forming strips.

It will be appreciated that the width of strips 7 and 8 is exactly double the width of the patch and consequently as strips 7 and 8, together with strip 13 approach the outer end of the machine, strips 7 and 8 which are now united together are slit as at 22 along their centre line by means of a revolving cutter 23, the cutter 23 also cutting through the parts of the strip 13 lying between strips 7 and 8.

At the output end of the machine two staggered guillotine type cutters are provided operated respectively by electric solenoids 24 and 25, which guillotine cutters cut the strips 7 and 8 which have already been longitudinally divided into short lengths, each length having its own associated loop shaped handle 6 and forming a composite patch and handle.

It will be appreciated that after strips 7 and 8 have been affixed to the strip 13 there is no longer any need for the loop shaped parts to be supported by the arms 15 and consequently the arms leave the two ramps and then re-assume a vertical position, the arms remaining in that position until they return to the input end of the machine and once more engage the ramps.

By providing the electrically heated rollers and also the hot zone for strip 13, strips 7, 8 and 13 will be heated sufficiently to cause partial melting of the material forming the strip 13 and the plastic coated faces of strips 7 and 8, the parts being therefore securely heat fixed or welded together.

It will be appreciated that FIGURES 1 and 2 are merely intended to illustrate diagrammatically the passage of strips 7 and 8 and the handle forming strip 13 through the machine and are not intended to show constructional details which form no part of the present invention, the composite patch and handle produced by the machine having the form shown in FIGURE 3.

It will be appreciated that with the construction shown the loop like handles will be of a standard length. To increase or decrease the length of the handles means may be provided for moving the endless chains further away from one another or closer together, this having the effect of altering the length of the loops. Although the machine shown includes endless chains, endless belts may alternatively be used.

The cutting of the superimposed strips 7 and 8 into short lengths to form the individual patches preferably as described, takes place at the output end of the machine but it is within the scope of the invention to feed the strip and its associated handles into a bag forming machine where the strip will be cut to length and the patches adhesively secured within the carrier bag adjacent the mouth, the two handles of each bag projecting upwardly above the bags upper edge.

If the handle forming strip takes the form of plastics tubing of for example circular cross-section the tubing will be flattened where it makes contact with the patch forming strip, the inner faces of the tubing being welded together at those points.

If a heat setting adhesive is used the strips may pass over suitable gluing rollers or the like before passing between the pressure rollers, the heat generated in the strips by the pressure rollers setting the adhesive.

On the other hand if a cold setting adhesive is used the rollers will not be heated but will merely be used to exert sufficient pressure on the adhesive coated strips to ensure a good stick.

Although in the machine shown the strips are passed between rollers they may alternatively be passed between shoes or like members which may for example be spring urged to grip the strips and electrically heated.

I claim:
1. A machine for producing a composite paper patch and loop-shaped carrying handle for attachment to a carrier bag, the handle and patch forming materials being in strip form and drawn from supply means at the feed end of the machine, comprising a pair of laterally spaced endless belt means lying in a common horizontal plane and driven at a uniform speed, a plurality of spaced upwardly projecting peg means on each of said belt means, means for wrapping said handle material about said peg means in zig-zag fashion, means to apply said patch forming strip to at least one side of said handle material substantially centrally of the sinuous length so that the handle material projects from opposite edges of the strip in the form of longitudinally spaced loops, and means for selectively exerting heat and pressure on the composite strip to insure a good fixation between the materials thereof.

2. A machine as claimed in claim 1 wherein said peg means comprise arms hingedly connected to said belt means, a freewheeling roller means on the free end of said arms, and means to raise said arms at the input end of the machine to assume proper positioning for engagement of said roller means with the handle forming material and to allow said arms to fall disengaging said roller means from the finished handles at the output end of the machine.

3. A machine as claimed in claim 1 further comprising heat means for heat fixing the patch and handle forming materials as they pass through said machine.

4. A machine as claimed in claim 1 further comprising means to coat the face of the patch forming strip lying adjacent the handle forming strip with a solution of plastics material having an affinity for the plastics handle forming strip.

5. A machine as claimed in claim 1 further comprising means to coat the patch forming strip and handle forming strip with an adhesive at the points where they engage.

6. A machine as claimed in claim 1 further comprising means to feed two superimposed flexible strips to opposite sides of the sinuous shaped handle forming strip substantially at the center of the sinuous length, means to join said superimposed strips to the handle forming strip and to each other.

7. A machine as claimed in claim 1 further comprising feed roller means for the patch forming strip which rollers rotate in opposite directions and apply pressure to the patch forming and handle forming strips at the points where they engage to ensure good adhesion therebetween.

8. A machine as claimed in claim 7 further comprising internal heating means for said rollers to heat fix the strips together.

9. A machine as claimed in claim 1 further comprising heat means through which the handle forming strip is passed prior to its engagement with the patch forming strip.

10. A machine as claimed in claim 1 further comprising means for at least partially separating the patch forming strip intermediate the handle to facilitate separation of the patch forming strip into individual patches each of which has a complete handle.

11. A machine as claimed in claim 1 further comprising means for adjusting the separation between the endless belt means to vary the length of the handle loops.

References Cited

UNITED STATES PATENTS

| | | | |
|---|---|---|---|
| 1,804,916 | 5/1931 | Cotte | 156—440 |
| 2,075,672 | 3/1937 | Stark | 156—440 XR |
| 3,054,442 | 9/1962 | Atwood et al. | 93—354 |

BERNARD STICKNEY, Primary Examiner.

U.S. Cl. X.R.

156—440, 459